United States Patent [19]

Naruse et al.

[11] Patent Number: 4,672,682
[45] Date of Patent: Jun. 9, 1987

[54] SLICE LEVEL DECIDING CIRCUIT

[75] Inventors: Seishiro Naruse; Fumio Nakamura, both of Tokyo, Japan

[73] Assignee: Oki Electric Industry Co., Ltd., Tokyo, Japan

[21] Appl. No.: 783,019

[22] Filed: Oct. 2, 1985

[30] Foreign Application Priority Data

Oct. 3, 1984 [JP] Japan .............................. 59-206267

[51] Int. Cl.⁴ .......................................... G06K 9/38
[52] U.S. Cl. ........................................ 382/53; 358/282
[58] Field of Search ............... 382/50, 53; 358/282, 358/284

[56] References Cited

U.S. PATENT DOCUMENTS 4,481,666 11/1984 Niwa .................................... 382/53
4,525,747 6/1985 Sakai et al. ............................ 382/53
4,539,600 9/1985 Takahashi et al. .................... 382/53
4,562,486 12/1985 Suzuki et al. ......................... 382/53

Primary Examiner—Leo H. Boudreau
Attorney, Agent, or Firm—Wenderoth, Lind & Ponack

[57] ABSTRACT

A slice level deciding circuit includes a slice level generator for generating a variable slice level and a comparator for comparing a slice level generated from the generator with a picture image signal. An optimum slice level can be provided by operating, via an arithmetic circuit, a prescribed value on the same slice level as generated from the generator when an output from the comparator satisfies a prescribed slice level deciding condition. Accordingly, deterioration of a picture image quality can be prevented, which is caused by changes of a quantity of light due to variations of ambient temperature around the light source used for obtaining a picture image signal from the readout medium and noise produced upon reading portions on the readout medium where a quantity of light from the light source is reduced.

2 Claims, 12 Drawing Figures

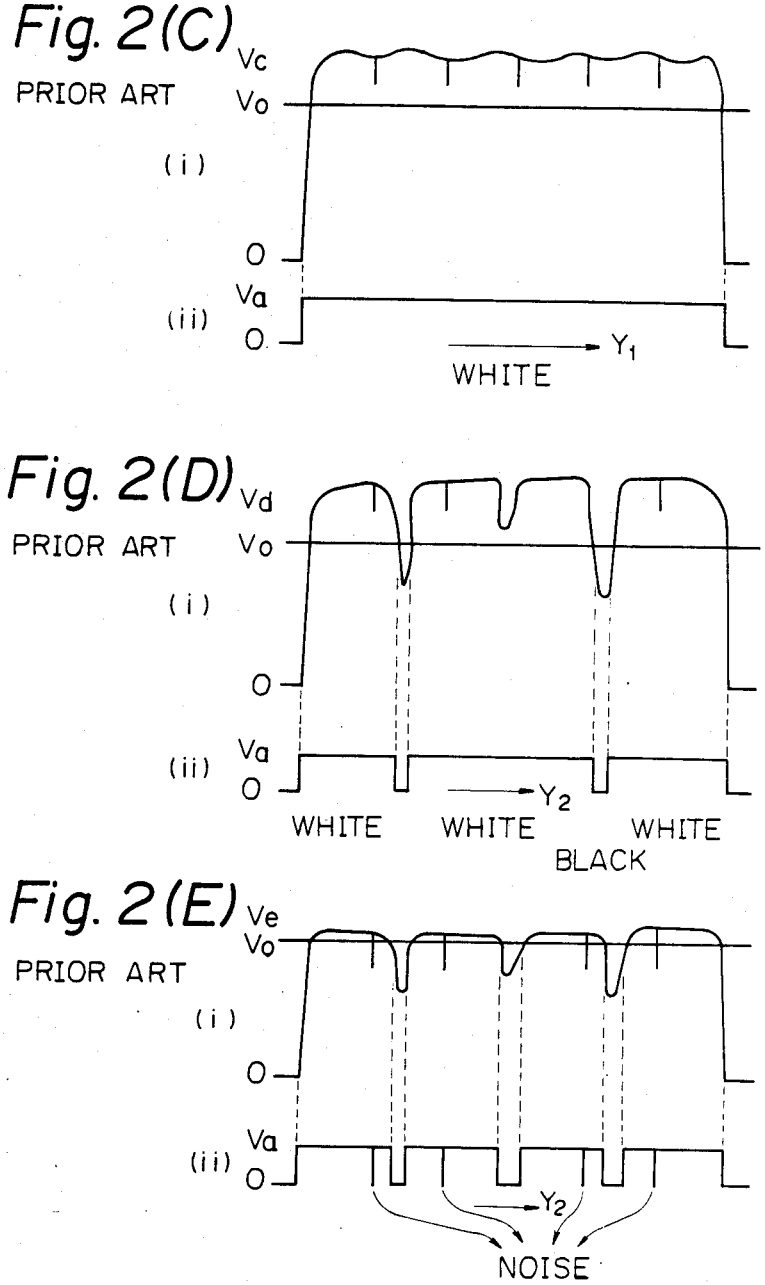

SLICE LEVEL DECIDING CIRCUIT

BACKGROUND OF THE INVENTION

1. Field of the Invention

The present invention relates to a slice level deciding circuit in an apparatus serving to read out a picture image.

2. Description of the Prior Art

FIGS. 1A and 1B of the accompanying drawings illustrate a prior slice level deciding system. Operation of the system will be described below with reference to FIGS. 2A-2E.

A surface of a readout medium 1 having characters, symbols and patterns written thereon is scanned by a light beam from a light source 2 to illuminate the surface to provide a line thereon. FIG. 2(A) illustrates an example of the readout medium 1. Dotted lines show ruled lines written with a dropout color, and symbols: 1, 2, T, --, A, B, and C, are examples of picture image information to be read out. In FIGS. 1(A) and 1(B), the readout medium 1 is scanned from the upper end to the lower end (in a direction of arrows $Y_1$, $Y_2$) by a light beam from the light source 2. A picture image light beam reflected from the readout medium 1 is transmitted along a light beam propagation path 3, adjusted to be uniform in its quantity by a shading plate 4, and projected onto a photodetector 6 via a lens 5. The reflected light projected onto the photodetector 6 is converted into an electric signal as a picture image signal, which is then amplified by an amplifier 7 and inputted into a comparator 10 as voltage V. By contrast, voltage generated by a reference voltage generator 8 is adjusted by means of a volume control 9 to provide reference voltage, and then inputted into the comparator 10. The comparator 10 serves to compare the voltage V of the image signal with the reference voltage Vo. Namely, if $V > Vo$, a picture image corresponding to the voltage V is decided to be white-colored, and if $V \leq Vo$, a picture image decided black-colored, as shown in FIGS. 2(C) through (E). FIG. 2(B) shows an ideal waveform of the voltage V=Vb corresponding to a scanning light beam line provided on the readout medium when no picture image is written on the readout medium 1. In this instance, also the comparator 10 outputs a signal voltage corresponding to a picture image being white (voltage Va) over the whole area of the readout medium. FIG. 2(C) shows an actual waveform of the voltage V=Vc corresponding to a light beam line on the readout medium as a picture image when no pattern is written on the readout medium 1. The upper part of the waveform waves due to shading adjustment. The figure shows that ruled lines written with a dropout color on the readout medium 1 are outputted. In addition, the comparator 10 outputs a signal of a picture image being white (voltage Va) over the whole area thereof. FIG. 2(D) shows a waveform of the voltage V=Vd of a light beam line provided on the readout medium as a picture image, and the comparator 10 outputs a signal representative of a picture image being black (voltage 0) for a fraction of the voltage V of the picture image signal lower than the reference voltage Vo. FIG. 2(E) shows a waveform of the voltage V=Ve of the picture image signal when an average level of the signal is lowered due to the influence of changes in the quantity of light from the light source due to changes of ambient temperature and the light source, as well as deterioration with age of the readout medium 1 itself. In this instance, ruled lines written on the readout medium 1 with a dropout color are also outputted as black-colored (Voltage 0).

Exemplifying the elements described above, the light source 2 is an ordinary fluorescent lamp; the shading plate 4 is made of a metallic plate formed into a prescribed shape; the photodetector 6 is available from Toshiba as TCD 102C; the amplifier 7 is available from National Semiconductor as LF357N; the reference voltage generator comprises NEC-made RD5. 1E-B2; and the comparator is available from National Semiconductor as LM319N.

As described above, according to a prior slice level deciding system, a picture image signal from the readout medium is converted from a light signal to an electric signal by a CCD type line sensor, and then a slice level used for deciding whether the picture image signal is white or black is set to a desired valve upon adjusting the system. Accordingly, changes in the quantity of light from the light source used for obtaining a picture image signal from the readout medium due to ambient temperature changes around the light source, and changes in a picture image signal yielded from portions on the readout medium where the quantity of light is partly reduced are displayed as noise.

SUMMARY OF THE INVENTION

It is an object of the present invention to provide an improved slice level deciding circuit in an apparatus capable of serving to read out picture image information written on a readout medium.

It is another object of the present invention to provide a slice level deciding circuit capable of optimizing a level difference among picture image signal voltages by making variable a slice level for deciding whether picture image information is white or black.

It is still another object of the present invention to provide a slice level deciding circuit capable of improving the quality of a picture image signal such for example as characters, symbols and patterns written on a readout medium.

It is a still further object of the present invention to provide a slice level deciding circuit which is not affected by changes in the quantity of light from a light source used for obtaining a picture image signal from a readout medium, deterioration with age of the readout medium itself, output variations of a dropout color written on readout media due to scattering of the media at manufacture thereof, and whether adjustment of a shading is good or bad.

The above and other objects can be accomplished by a slice level deciding circuit in which picture image information read out by an optical means is converted to an electric signal to provide a picture image signal, and the signal is then compared with a prescribed slice level in a comparator to decide whether the picture information is white or black, comprising a means for generating a variable slice level for deciding an optimal slice level and an arithmetic means for assigning a prescribed value to an output from the comparator.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2(A) through (E) are schematic views illustrating operation of the prior slice level deciding circuit;

DESCRIPTION OF THE PREFERRED EMBODIMENT

Figures 1A, 1B:
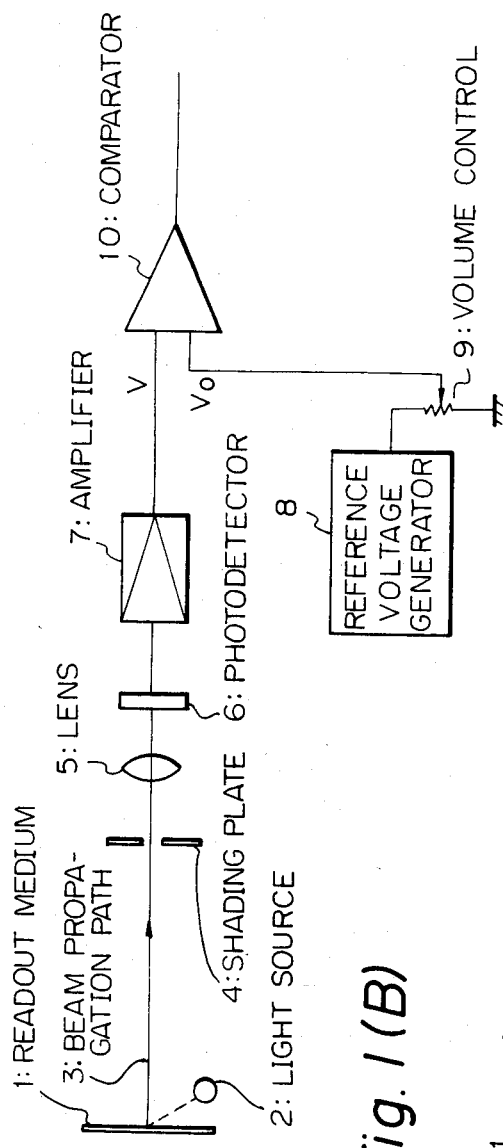
FIG. 1(A) is a block diagram illustrating a prior slice level deciding circuit.
FIG. 1(B) is a perspective schematic view of the readout medium, light source, beam propagation path, shading plate, lens and photodetector shown in FIG. 1(A).
Figure 2A:
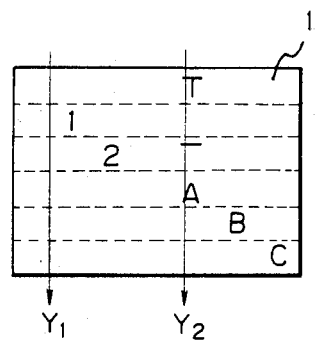
Figure 2B:
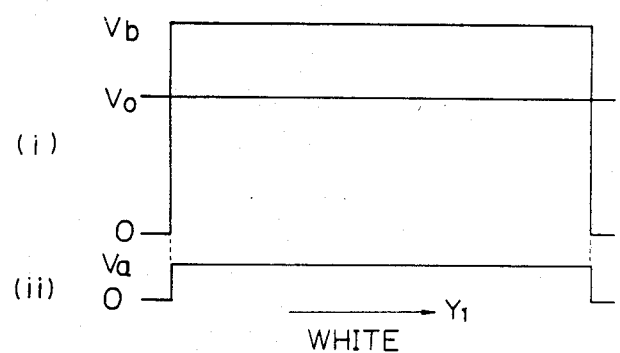
Figure 3:
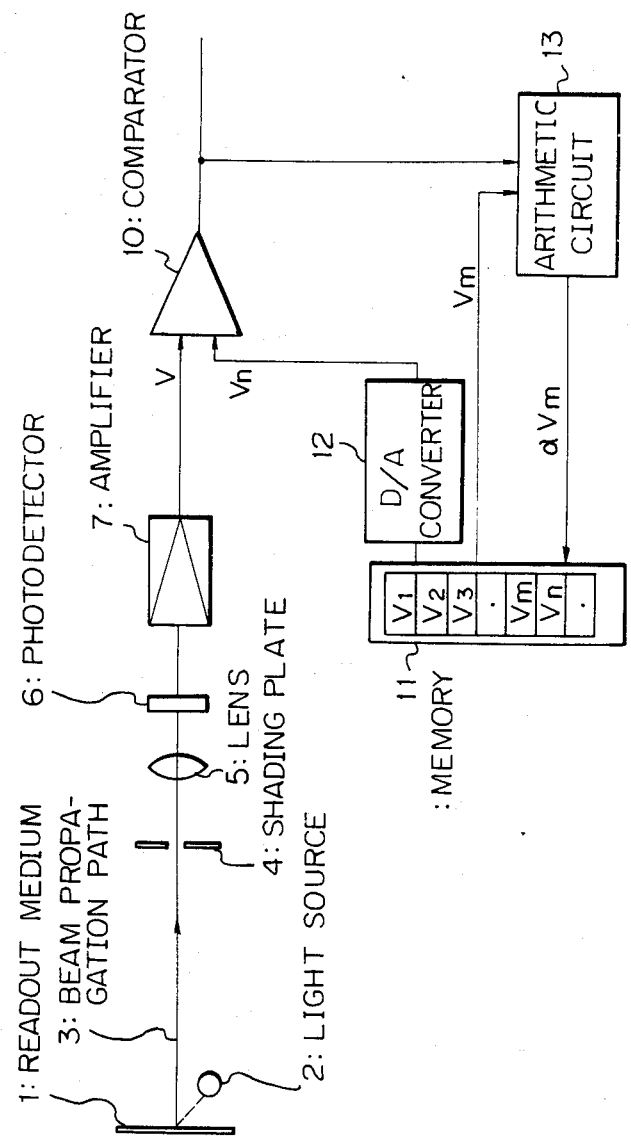
FIG. 3 is a block diagram illustrating an embodiment of a slice level deciding circuit according to the present invention.

FIG. 3 is a block diagram illustrating an embodiment of a slice level deciding circuit according to the present invention. In the figure, the same reference numbers as those in FIGS. 1(A) and 1(B) show the same elements except those described below. Namely, designated at 11 is a memory for storing digital values corresponding to voltages $V_1, V_2, \ldots, V_m, V_n \ldots (V_1 > V_2 \ldots > V_m, V_n = \alpha V_m)$ of slice levels, each of which decides whether a picture image on the readout medium 1 is white or black and is changeable in response to a state of a reflected light bearing the picture image from the readout medium 1, designated at 12 is a D/A converter for converting a digital value corresponding to each of the voltages $V_1, V_2, \ldots$ of the slice level successively outputted from the memory 11 to an analog voltage value, and designated at 13 is an arithmetic circuit for multiplying digital values of slice levels outputted in succession from the memory 11 by a constant $\alpha(0<\alpha<1)$ according to an instruction signal from the comparafor 10, and supplying the resultant values again to the memory 11. Exemplifying here each element described above, the memory 11 is available from INTEL as D27128, the D/A convertor 12 is available from Motorola as MC 1408L8, and the arithmetic circuit 13 is available from INTEL as P8051.

Figure 4A:
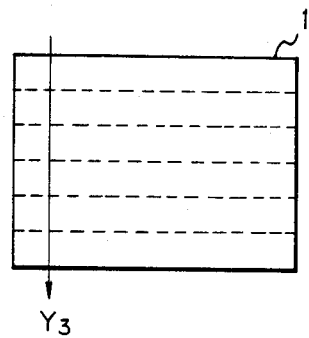
FIGS. 4(A) and 4(B) are schematic views illustrating operation of the embodiment of FIG. 3.
Figure 4B:
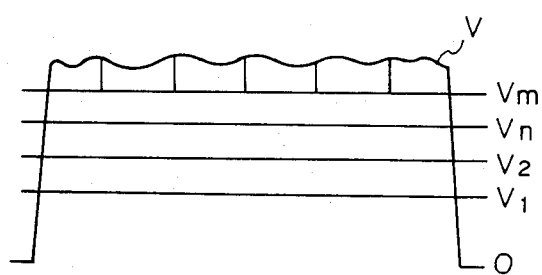

Operation of the present embodiment will be described below: The surface of the readout medium 1 on which no pattern is written except ruled lines written with a dropout color as shown in FIG. 4(A) is scanned from the upper to the lower part (in a direction of an arrow $Y_3$) by a beam of light from the light source 2 so as to form a line. A picture image light beam reflected from the readout medium 1 propagates along a beam propagation path 3, made uniform in a quantity of light by the shading plate 4, and projected onto the photodetector 6 via the lens 5. The reflected picture image light beam projected onto the photodetector 6 is converted to an electric signal representative as a picture image signal, which is then amplified by the amplifier 7 and inputted into the comparator 10 as voltage V. A waveform of the voltage V is as shown in FIG. 4(B), which is dependent on an output corresponding to the ruled lines written on the readout medium 1 with a dropout color, shading adjustment by the shading plate 4 and changes of a quantity of light from the light source.

Hereupon, a digital value corresponding to voltage $V_1$ of a slice level is outputted from the memory 11 based on an instruction from a control circuit (not shown), and its analog voltage converted in the D/A converter 12 is inputted into the comparator 10. The comparator 10 compares the voltage V of the picture image signal with the voltage $V_1$ of the slice level. In this comparison, if $V > V_1$ at any point on one of the ruled lines, then voltage $V_2$ of a slice level is outputted from the memory 11 according to an instruction from the control circuit, and compared in the same way as above. If again $V > V_2$, then slice level voltage $V_3$ is outputted from the memory 11 according to an instruction from the control circuit and compared as before. These comparisons are continued until a slice level deciding condition $V \leq Vm$ (Vm: a certain slice level voltage) is satisfied. After the slice level voltage Vm satisfying the above relation $V \leq Vm$ has been determined, an output from the comparator 10 is inverted, which is then inputted into the arithmetic circuit 13 to permit it to be driven. Simultaneously, a digital value corresponding to the slice level voltage Vm is supplied from the memory 11 to the arithmetic circuit 13. The arithmetic circuit 13 multiplies the digital value by a constant $\alpha(0<\alpha<1)$, and supplies the resultant value $\alpha Vm$ again to the memory 11. The memory 11 outputs a value Vn $(=\alpha Vm)$ corresponding to the $\alpha Vm$, and decides that the Vn is slice level voltage to be supplied to the comparator 10 via the D/A comparator 12. $\alpha(0<\alpha<1)$ used here is a constant selected preferably to permit a slice level of smaller value than the Vm corresponding to a ruled line portion written on the readout medium with a dropout color.

In the present embodiment, a slice level is decided by arbitrary scanning corresponding to one line, and the picture screen is read out by likewise conducting scanning corresponding to one line, while moving a readout medium perpendicularly to the scanning.

Accordingly, for characters, symbols, and patterns written on the readout medium 1, voltage V of a picture image signal provided by the above described operation and a slice level Vn decided as described above are compared with each other in the comparator 10. In this comparison, if $V < Vn$, the picture image is decided black, and if $V > Vn$, the picture is decided white.

Figure 6:
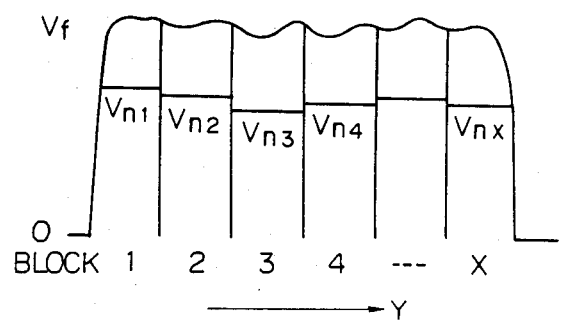
FIG. 6 is a view showing an output voltage waveform when a slice level is finely divided into blocks.
Figure 5:
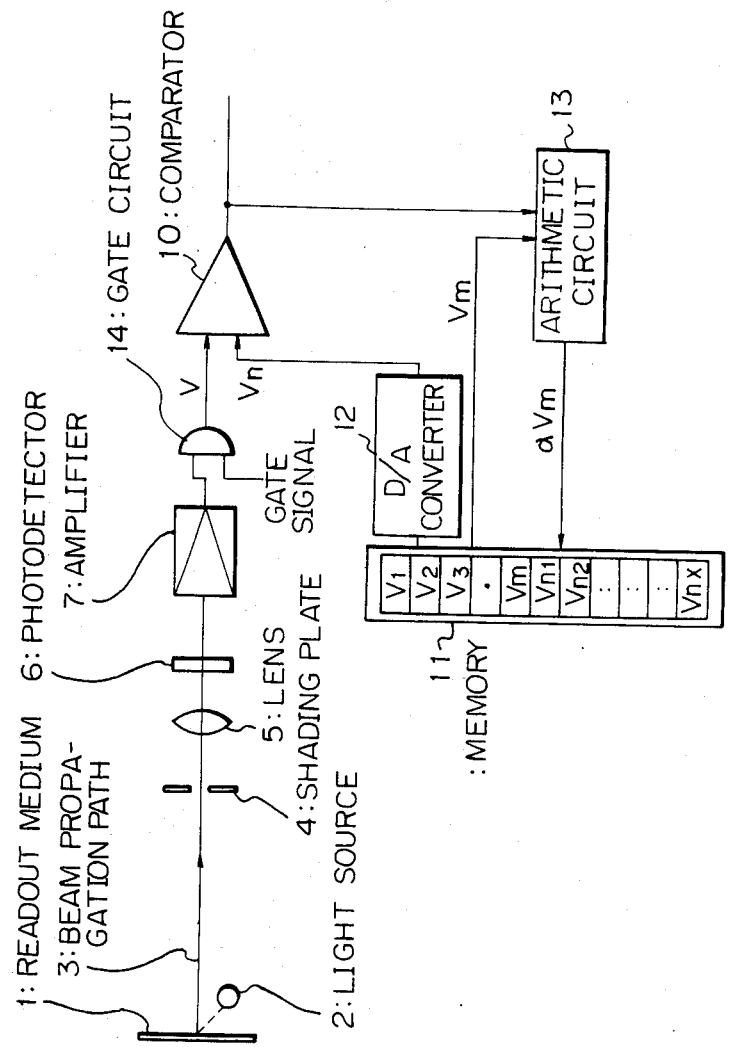
FIG. 5 is a block diagram illustrating another embodiment according to the present invention.

FIG. 5 is a block diagram illustrating another embodiment of a slice level deciding circuit according to the present invention. In the figure, the same reference numbers as those in FIG. 3 signify the same elements, excepting elements described below. Namely, designated at 14 is a gate circuit. A reflected picture image light beam which is obtained by scanning the readout medium by the light source so as to illuminate the medium as one line is converted via the photodetector 6 to a picture image signal corresponding to the one line. The picture image signal is divided into X blocks by the gate circuit 14 by gate signals from a control circuit (not shown). As described above, the gate circuit 14 serves to pass only part of the picture image signal divided into X blocks therethrough. The gate circuit 14 is available from Hirel as SD215DE. Then, with the same operation as the embodiment of FIG. 3, slice levels for every blocks $Vn_1, Vn_2, \ldots, Vn_x$ are decided (refer to FIG. 6). Reading out the picture image signal with use of the slice levels so obtained for the respective blocks, local dropping of a shading waveform and flaws on the readout medium 1, etc., can be corrected.

While the invention has been particularly shown and described with reference to the preferred embodiments thereof, it will be obvious to those skilled in the art that the foregoing and other changes in form and details can be made therein without departing from the spirit and scope of the invention.

What is claimed is:

1. In an apparatus for reading out a picture image from a readout medium having ruled lines thereon in a dropout color by comparing in a comparison circuit a signal level of a picture image signal optically read from a readout medium and converted to an electrical signal, to a preselected slice level $\alpha V_m$, the improvement comprising a slice level selection circuit for selecting said preselected slice level $\alpha V_m$, said slice level selection circuit including:

means for generating slice level signals of successively incrementally increased magnitudes $V_1, V_2, \ldots V_n$;

comparator means for successively comparing all values V of the signal level of an electrical signal converted from a picture image signal optically read from the surface of a readout medium on which no pattern is written except the ruled lines, to the successively incrementally increased magnitudes $V_1, V_2, \ldots V_n$ of slice level until all values V of said signal level are less than a magnitude $V_m$ among said incrementally increased magnitudes $V_1, V_2, \ldots V_n$;

an arithmetic circuit;

means for inputting a signal indicative of said magnitude $V_m$ into said arithmetic circuit, said arithmetic circuit including means for multiplying said signal indicative of said magnitude $V_m$ by a constant value $\alpha$, $0 < \alpha < 1$ to generate a signal indicative of said preselected slice level $\alpha V_m$; and means for inputting to a memory and from said memory to said comparator means said signal indicative of said preselected slice level $\alpha V_m$, said comparator means including means for comparing values of the signal level of an electrical signal converted from a picture image signal optically read from the surface of a readout medium to said preselected slice level $\alpha V_m$.

2. In an apparatus for reading out a picture image from a readout medium by comparing in a comparison circuit a signal level of a picture image signal optically read from a readout medium and converted to an electrical signal, to a preselected slice level $\alpha V_m$, the improvement comprising a slice level selection circuit for selecting said preselected slice level $\alpha V_m$, said slice level selection circuit including:

means for generating slice level signals of successively incrementally increased magnitudes $V_1, V_2, \ldots V_n$;

comparator means for successively comparing all values V of the signal level of an electrical signal converted from a picture image signal optically read from the surface of a readout medium, to the successively incrementally increased magnitudes $V_1, V_2, \ldots V_n$ of slice level until all values V of said signal level are less than a magnitude $V_m$ among said incrementally increased magnitudes $V_1, V_2, \ldots V_n$;

an arithmetic circuit;

means for inputting a signal indicative of said magnitude $V_m$ into said arithmetic circuit said arithmetic circuit said arithmetic circuit including means for multiplying said signal indicative of said magnitude $V_m$ by a constant value $\alpha$, $0 < \alpha < 1$ to generate a signal indicative of said preselected slice level $\alpha V_m$; and means for inputting to a memory and from said memory to said comparator means said signal indicative of said preselected slice level $\alpha V_m$, said comparator means including means for comparing values of the signal level of an electrical signal converted from a picture image signal optically read from the surface of a readout medium to said preselected slice level $\alpha V_m$.

* * * * *